United States Patent
Sugimura et al.

(10) Patent No.: US 12,265,875 B2
(45) Date of Patent: Apr. 1, 2025

(54) RFID TAG FOR RUBBER PRODUCT AND METHOD OF MANUFACTURING RFID TAG FOR RUBBER PRODUCT

(71) Applicant: PHOENIX SOLUTION CO., LTD., Kanazawa (JP)

(72) Inventors: Shiro Sugimura, Kanazawa (JP); Tatsuji Niwata, Kanazawa (JP)

(73) Assignee: PHOENIX SOLUTION CO., LTD., Kanazawa (JP)

( * ) Notice: Subject to any disclaimer, the term of this patent is extended or adjusted under 35 U.S.C. 154(b) by 0 days.

(21) Appl. No.: 18/251,100

(22) PCT Filed: Feb. 12, 2021

(86) PCT No.: PCT/JP2021/005159
§ 371 (c)(1),
(2) Date: Apr. 28, 2023

(87) PCT Pub. No.: WO2022/091440
PCT Pub. Date: May 5, 2022

(65) Prior Publication Data
US 2024/0005123 A1    Jan. 4, 2024

(30) Foreign Application Priority Data

Oct. 30, 2020   (JP) ................................ 2020-183072

(51) Int. Cl.
*G06K 19/077* (2006.01)
*H01Q 1/22* (2006.01)

(52) U.S. Cl.
CPC ..... *G06K 19/07773* (2013.01); *H01Q 1/2208* (2013.01)

(58) Field of Classification Search
CPC ....... G06K 19/07773; G06K 19/07749; G06K 19/07764; G06K 19/07779;
(Continued)

(56) References Cited

U.S. PATENT DOCUMENTS

| 2013/0249302 A1* | 9/2013 | An | H02J 50/10 307/104 |
| 2023/0274122 A1* | 8/2023 | Sugimura | H01Q 7/00 235/492 |

FOREIGN PATENT DOCUMENTS

| EP | 505906 A1 * | 9/1992 | ......... B60C 23/0493 |
| JP | 2002264617 A * | 9/2002 | ......... B60C 23/0452 |

(Continued)

*Primary Examiner* — Thien M Le
*Assistant Examiner* — Tae W Kim
(74) *Attorney, Agent, or Firm* — Muncy, Geissler, Olds & Lowe, P.C.

(57) ABSTRACT

An RFID tag 1 for a rubber product is provided with a coupling transformer 40, an RF chip 10 connected to a secondary side of the coupling transformer, a printed circuit board 20 on which the RF chip is mounted, and an antenna 30, wherein the antenna comprises a coil section 31, a first element 32 extending from one end of the coil section, and a second element 33 extending from another end of the coil section in parallel with the first element and shorter than the first element, the coil section has fewer windings than the coupling transformer 40 on the secondary side, and the printed circuit board 20 is held in a gap between strands of the coil section such that the coil section forms a primary side of the coupling transformer.

15 Claims, 7 Drawing Sheets

(58) Field of Classification Search
CPC ............. G06K 19/0723; H01Q 1/2208; H01Q 1/2225; H01Q 1/2241; H01Q 7/00; H01Q 19/02; B60C 19/00
USPC ........................................................ 235/492
See application file for complete search history.

(56) References Cited

FOREIGN PATENT DOCUMENTS

| | | |
|---|---|---|
| JP | 2005-85089 A | 3/2005 |
| JP | 2006-172166 A | 6/2006 |
| JP | 2017-132291 A | 8/2017 |

\* cited by examiner

RFID TAG FOR RUBBER PRODUCT AND METHOD OF MANUFACTURING RFID TAG FOR RUBBER PRODUCT

TECHNICAL FIELD

The present invention relates to an RFID tag for a rubber product and a method of manufacturing an RFID tag for a rubber product, the RFID tag being compact with superior mass productivity and durability.

BACKGROUND ART

An antenna and an RF chip are stored in a radio-frequency identification (RFID) tag used in an RFID system designed for contactless communication whereby the antenna is used to receive a carrier wave transmitted from an antenna of a reader/writer and return identification data and the like recorded in the RF chip to the reader/writer on a reflected wave.

RFID tags can be affixed to or embedded in the tires of vehicles such as automobiles, for example, to manage tire-specific information and a history of tire manufacturing, distribution, maintenance, and the like. Naturally, RFID tags can also be attached to or embedded in rubber products other than tires to help manage such products.

Patent Literature 1 discloses a technology for a tire with a built-in RFID tag provided with a first antenna connected to an IC chip and a second antenna electromagnetically coupled to the first antenna, wherein the second antenna is electromagnetically coupled to a conductive carcass ply cord.

CITATION LIST

Patent Literature

Patent Literature 1: Japanese Patent Laid-Open No. 2017-132291

SUMMARY OF INVENTION

Technical Problem

In the case of attaching an RFID tag to a tire, there is the problem of the RFID tag being damaged due to deformation of the tire while driving. In addition, there is the problem in which the free electrons of the carbon black in the tire undergo a charge shift from negative to positive when exposed to radio waves, which causes the current to flow from positive to negative, which in turn causes the impedance and the relative permittivity to change.

In Patent Literature 1, there is the problem that since the first antenna and the second antenna are electromagnetically coupled and the signal source impedance of the second antenna is high, the configuration is susceptible to changes in the impedance and relative permittivity due to the effects of carbon black.

Moreover, the second antenna is provided with a pair of extensions extending to the left and right from the electromagnetic coupling section, and therefore when the tire deforms, the left and right extensions are pulled to the left and right with the electromagnetic coupling section at the center, and may be damaged.

Furthermore, there is the problem that an RFID tag using a conventional half-wave dipole antenna is large in size and the problem that even in the case of using a meander line antenna, in which the antenna element is bent into a more compact size, determining the effective meander length is difficult due to the effects of carbon black.

Such problems may also arise when an RFID tag is used in rubber products other than tires, particularly rubber products containing materials such as carbon black that would affect the communication performance of the RFID tag.

In consideration of these problems, an objective of the present invention is to provide an RFID tag for a rubber product and a method of manufacturing an RFID tag for a rubber product, the RFID tag being compact with superior mass productivity and durability.

Solution to Problem

An RFID tag for a rubber product of the present invention is provided with a coupling transformer, an RF chip connected to a secondary side of the coupling transformer, a printed circuit board on which the RF chip is mounted, and an antenna, wherein the antenna comprises a coil section, a first element extending from one end of the coil section, and a second element extending from another end of the coil section in parallel with the first element and shorter than the first element, the coil section has fewer windings than the coupling transformer on the secondary side, and the printed circuit board is held in a gap between strands of the coil section such that the coil section forms a primary side of the coupling transformer.

Also, the RFID tag is for a rubber product containing carbon black.

Also, insulating layers are provided on both upper and lower surfaces of the printed circuit board.

Also, the coil section, the first element, and the second element are formed from a single conducting wire.

Also, an axis of a secondary coil of the coupling transformer is aligned with an axis of the coil section.

Also, provided that $\lambda$ is the wavelength of a radio wave at a communication frequency, a portion consisting of the first element, the second element, and the coil section has an electrical length of $\lambda/4$.

A method of manufacturing an RFID tag for a rubber product of the present invention includes a step of arranging a plurality of secondary coils of a coupling transformer in a left-right direction on a printed circuit board, a step of providing openings on front and back sides of the plurality of secondary coils arranged in the left-right direction, and a step of making cutouts between the plurality of secondary coils arranged in the left-right direction.

Also, the method further includes a step of using an antenna comprising a coil section, a first element extending from one end of the coil section, and a second element extending from another end of the coil section in parallel with the first element and shorter than the first element to insert the secondary coil into a gap between strands of the coil section using the front-side opening, such that the coil section forms a primary side of the coupling transformer.

Advantageous Effects of Invention

In the RFID tag for a rubber product of the present invention, a printed circuit board is held in the gap in the coil section to thereby form a coupling transformer. Consequently, mass productivity of the RFID tag for a rubber product can be increased.

Also, in the present invention, since first and second elements that function as an antenna extend in parallel, the RFID tag is more resistant to damage with superior durability, and a compact RFID tag is obtained compared to a conventional half-wave dipole antenna.

Also, in the present invention, by reducing the number of windings in the coil section that serves as the primary side to less than the number of windings in the secondary coil, low impedance is obtained for the input on the primary side and the secondary side is converted to high impedance by the coupling transformer to match the input impedance of the RF chip. By lowering the impedance on the primary side, the effects of carbon black and the like can be lessened even if the RFID tag is used in a rubber product containing carbon black or the like, for example.

By providing insulating layers on both the upper and lower surfaces of the printed circuit board, it is possible to avoid a situation in which the coil section and the secondary coil are electrically connected.

If the coil section, the first element, and the second element are made by bending a single conducting wire, the antenna is easy to manufacture and more reliable electrical connections are obtained between the coil section, the first element, and the second element.

By aligning the axis of the secondary coil of the coupling transformer with the axis of the coil section, the efficiency of the coupling transformer can be increased.

If the electrical length of the portion including the first element, the second element, and the coil section is $\lambda/4$, the length of the antenna will be minimized and an even more compact RFID tag for a rubber product can be obtained.

According to the method of manufacturing an RFID tag for a rubber product of the present invention, the opening on the front side can be used to easily insert the secondary coil into the gap of the coil, thereby increasing manufacturing efficiency.

Moreover, a printed circuit board of predetermined size can be obtained easily by using the cutouts between the secondary coils and the front and back openings.

DESCRIPTION OF EMBODIMENTS

Figure 1:
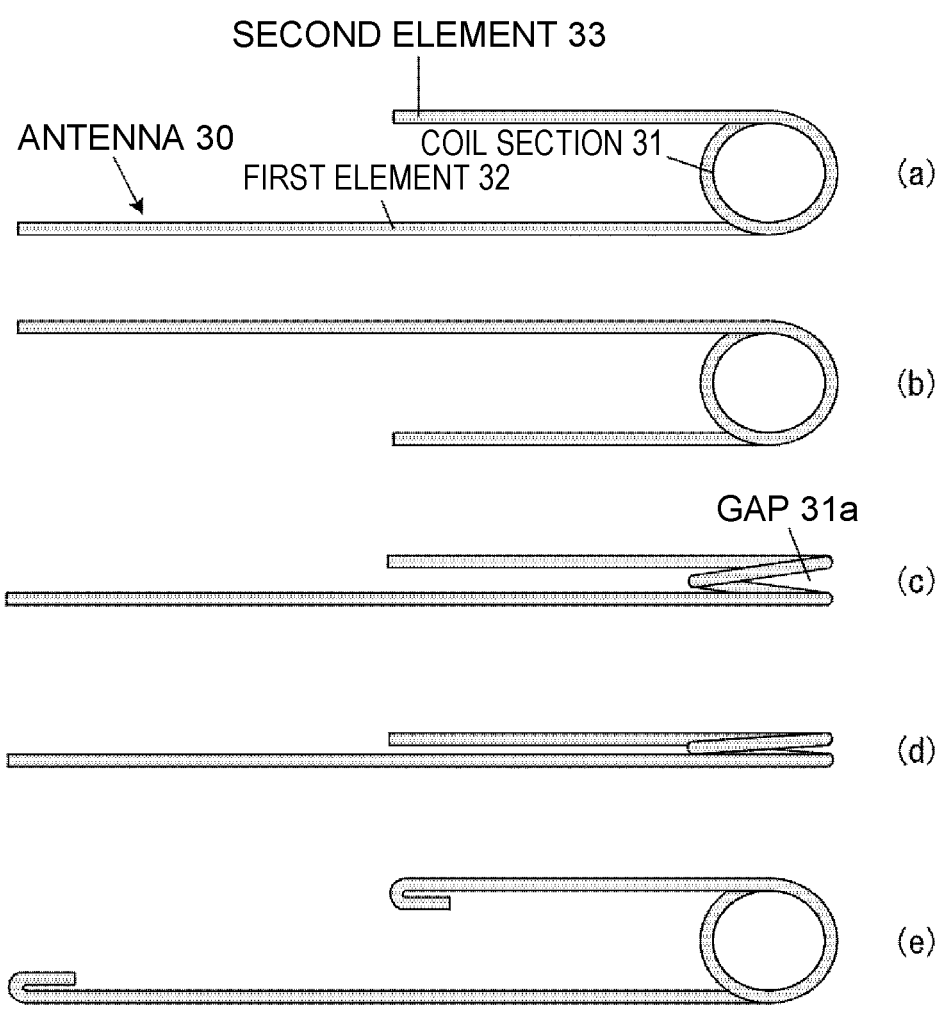
FIG. 1 illustrates a plan view (a), a bottom view (b), a side view (c), a modification (d), and a modification (e) of an antenna.
Figure 2:
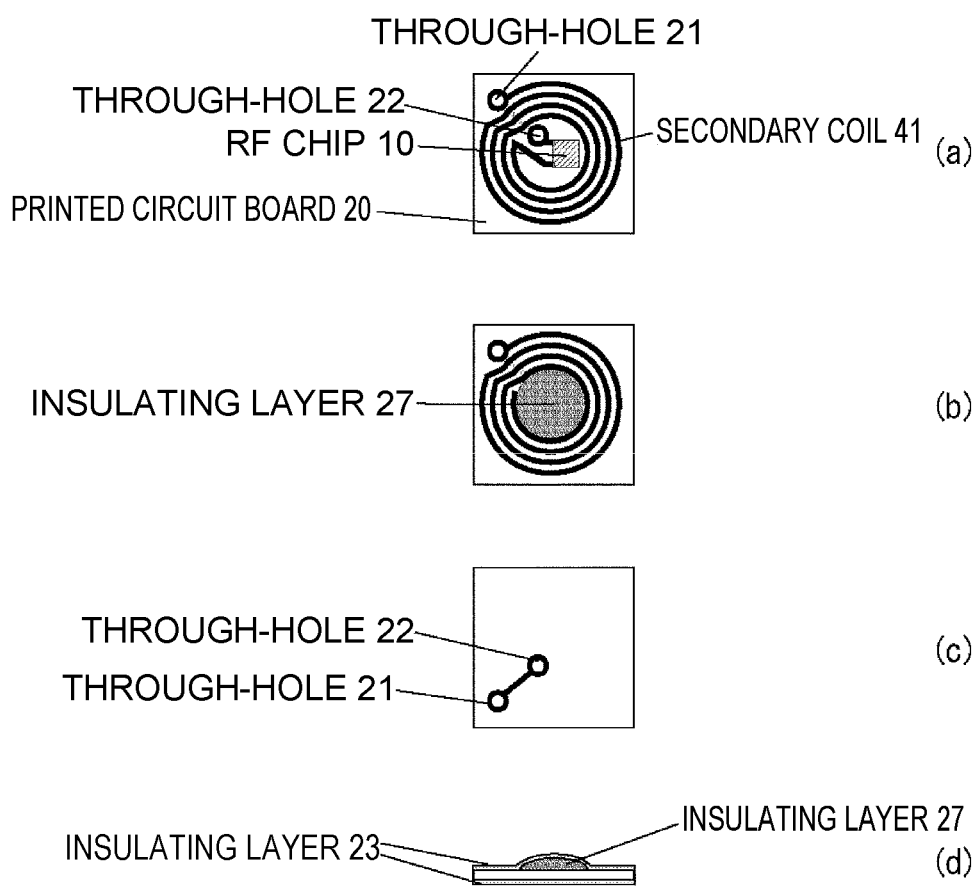
FIG. 2 illustrates a plan view (a) illustrating a state in which an RF chip and a secondary coil are mounted on a printed circuit board, and a plan view (b), a bottom view (c), and a side view (d) illustrating a state in which the RF chip and connection points are encapsulated.

An embodiment of an RFID tag 1 for a rubber product of the present invention will be described using the drawings.

As illustrated in FIGS. 1 to 4, the RFID tag 1 for a rubber product is provided with an RF chip 10, a printed circuit board 20, an antenna 30, and a coupling transformer 40. Note that in the following description, the RFID tag 1 for a rubber product may simply be referred to as the "RFID tag 1" in some cases.

The RF chip 10 is connected to the secondary side of the coupling transformer 40 described later. A commercial off-the-shelf chip can be used as the RF chip and it is preferable to use a chip resistant to vulcanization temperatures of about 120° C.

As illustrated in FIG. 2(a), the RF chip 10 is mounted on the upper surface of the printed circuit board using an adhesive such as epoxy die bond material.

Furthermore, a secondary coil 41 of the coupling transformer 40 is formed on the upper surface of the printed circuit board 20. One of the two terminals of the secondary coil 41 is connected to a terminal of the RF chip 10 by wire bonding. The other terminal of the secondary coil 41 reaches the lower surface of the printed circuit board 20 via a through-hole 21, as illustrated in FIG. 2(a) and FIG. 2(c), further reaches the upper surface of the printed circuit board 20 via a through-hole 22, and is connected to a terminal of the RF chip 10 by wire bonding. In the present embodiment, the secondary coil 41 has approximately 4 (in actuality, 3.96) windings. The secondary coil 41 is not limited to a flat coil formed by vapor deposition or the like, but may also be a coil of a conducting wire. As illustrated in FIG. 2(b), the RF chip 10 and the connection points are preferably encapsulated by an insulating layer 27.

As illustrated in FIG. 2(d), the upper surface of the printed circuit board 20, that is, the upper surface of the RF chip 10 and the secondary coil 41, is encapsulated by the insulating layer 23. The lower surface of the printed circuit board 20 is also encapsulated by an insulating layer 23. For the insulating layer 23, insulating resins such as epoxy resins, acrylic-based resins (resins with acrylic resins and derivatives as the main component), and urethane resins can be used.

The antenna 30 is provided to receive a carrier wave from a reader/writer and also return a reflected wave to the reader/writer.

The antenna 30 is provided with a coil section 31, a first element 32, and a second element 33. A metal wire such as copper wire, iron wire, or brass wire may simply be used as the material of the strands of the antenna 30.

The coil section 31 functions as the primary side of the coupling transformer 40. The number of windings in the coil section 31 must be less than the number of windings on the secondary side. In the present embodiment, the strands forming the coil section 31 has 1.5 windings, with a gap 31a formed between the strands. Note that a space between the strands may naturally open when no external force is applied to the coil section 31, and this open area may be treated as the gap 31a, or alternatively, as illustrated in FIG. 1(d), the strands may be in substantially close contact with each other when no external force is applied to the coil section 31, the strands may be elastically opened by applying an external force to the coil section 31 in the vertical direction (axial direction), and this opened area may be treated as the gap 31a. The diameter of the coil section 31 as seen in a plan view is preferably the same or slightly greater than the outer diameter of the secondary coil 41.

The first element 32 is a member extending from one end of the coil section 31. Provided that $\lambda$ is the wavelength of a radio wave at the communication frequency of the RFID tag 1, if the electrical length of the first element 32 is set to any of λ/4, λ/2, (3/4)λ, or (5/8)λ, the resonant frequency of the first element 32 can be made to match the communication frequency λ of the RFID tag 1, which is preferable.

The second element 33 is a member extending from the other end of the coil section 31 in parallel with the first element 32 and shorter than the first element 32.

In one example, the antenna 30 can be generally minimized in length by making the first element 32 approximately 0.185, of the wavelength and the second element 33 approximately 0.046, of the wavelength, so that the total length of the first element 32, the second element 33, and the coil section 31 is approximately λ/4.

In the present embodiment, the coil section 31, the first element 32, and the second element 33 are formed by bending a single conducting wire. This arrangement makes the antenna 30 easy to manufacture and increases the reliability of the electrical connections between the coil section 31, the first element 32, and the second element 33, but the antenna 30 is not limited thereto and may also be formed by joining multiple conducting wires to each other end to end.

As illustrated in FIG. 1(e), if the ends of the first element 32 and the second element 33 are bent back, it is possible to prevent situations in which the ends of both elements 32 and 33 pierce or tear into the rubber product as well as situations in which the RFID tag 1 is damaged when the RFID tag 1 is attached to the rubber product.

Figure 3:
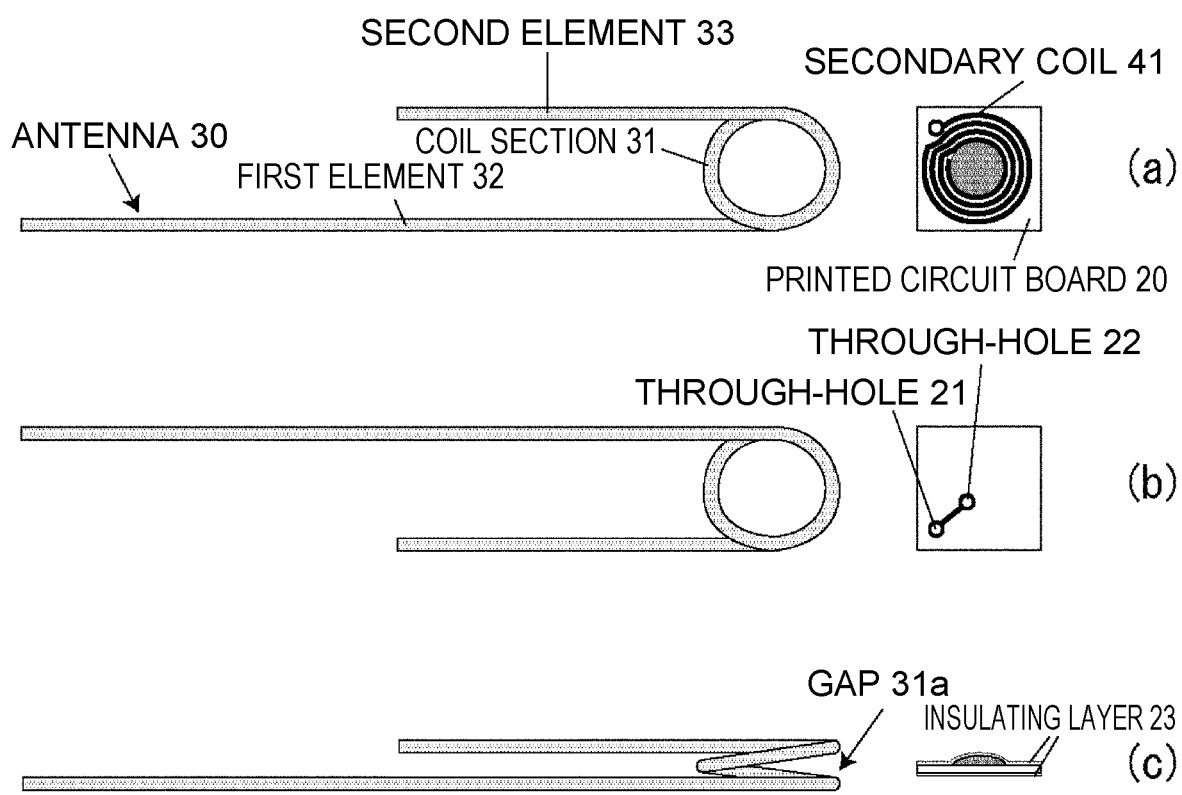
FIG. 3 illustrates a plan view (a), a bottom view (b), and a side view (c) illustrating a state before a printed circuit board is inserted into the gap in the coil section.
Figure 4:
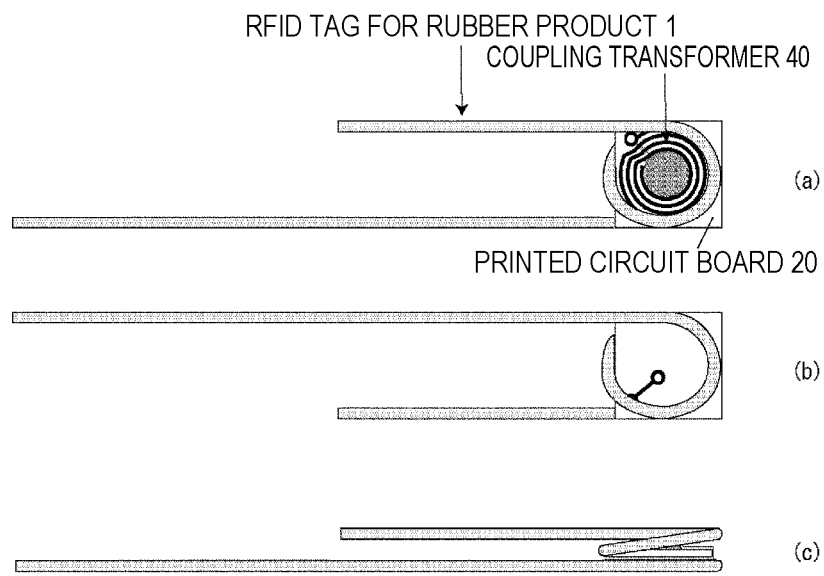
FIG. 4 illustrates a plan view (a), a bottom view (b), and a side view (c) illustrating a state after a printed circuit board is inserted into the gap in the coil section.

As illustrated in FIGS. 3 and 4, by inserting the printed circuit board 20 into the gap 31a between the strands of the coil section 31, the printed circuit board 20 is held and the coil section 31 forms the primary side of the coupling transformer 40. Preferably, the axis of the coil section 31 and the axis of the secondary coil 41 are aligned. Since both the upper and lower surfaces of the printed circuit board 20 are encapsulated by the insulating layer 23, the coil section 31 and the secondary coil 41 are not electrically connected. Also, the strands of the coil section 31 in the portion where the printed circuit board 20 is not inserted are obviously insulated from each other to maintain the electrical coil function.

Figure 5:
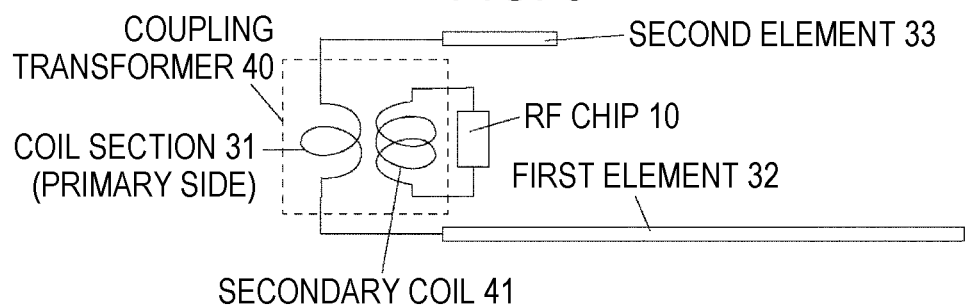
FIG. 5 is an equivalent circuit diagram of an RFID tag for a rubber product.

FIG. 5 is an equivalent circuit diagram for the case in which the RFID tag 1 is attached to a rubber product such as a tire. During reception, a radio wave received by the first element 32 and the second element 33 is conveyed to the RF chip 10 through the coupling transformer 40. Specifically, a current of the inverse phase of the radio wave flows through the first element 32 and the second element 33, which causes a current to flow through the coil section 31 on the primary side and induces an AC voltage in the secondary coil 41.

Whereas the impedance of the RF chip 10 ranges approximately from a few kΩ to 10 kΩ, the impedance between the first element 32 and the second element 33 is small, approximately 100Ω. The small impedance between the first element 32 and the second element 33 is largely due to the impedance of the antenna 30 itself in addition to resistive components such as carbon black in the rubber product. Vulcanized rubber tires have a resistivity of around a few tens of kΩ·cm, depending on the type. Assuming that the RFID tag 1 of the present invention is embedded in a vulcanized rubber tire and both terminals of the RF chip 10 are directly connected to the first element 32 and the second element 33, received radio waves cannot be guided efficiently to the RF chip 10.

Accordingly, in the RFID tag 1 of the present invention, the ratio n (n=N2/N1) of the number N2 of windings on the secondary side and the number N1 of windings on the primary side of the coupling transformer 40 is adjusted. Specifically, if the RF chip 10 having an input impedance Z is connected to the first element 32 and the second element 33 through the coupling transformer 40, the impedance on the primary side of the coupling transformer 40 is $Z/n^2$. Therefore, by reducing the number N1 of windings in the coil section 31 that serves as the primary side to less than the number N2 of windings in the secondary coil 41 to increase n, low impedance is obtained for the input on the primary side and the secondary side is converted to high impedance by the coupling transformer 40 to match the input impedance Z of the RF chip 10. By lowering the impedance on the primary side, the effects of carbon black and the like can be lessened even if the RFID tag 1 is used in a rubber product containing carbon black or the like, for example.

However, increasing the number N2 of windings on the secondary side is constrained by, among other things, the area of the coupling transformer 40, and the ratio n of the numbers of windings on the secondary side and the primary side must be adjusted appropriately in accordance with, among other things, the specifications of the RF chip 10 and the material and content of carbon black and the like of the rubber product.

The antenna 30 of the RFID tag 1 operates similarly to a monopole antenna 30 with the second element 33 as the ground plane and the first element 32 as the antenna wire. Affixing or embedding the RFID tag 1 in a vulcanized rubber product has the advantage whereby the second element 33 electrically connects to the vulcanized rubber product to further strengthen the ground plane.

Moreover, in a conventional RFID tag of the dipole antenna type, two antenna elements with an electrical length of λ/4 extend to the left and right from a printed circuit board on which an RF chip is mounted. In this configuration, if the rubber product deforms and forces in the respectively opposite directions are imparted to the two antenna elements, the connection points between the antenna elements and the printed circuit board may be damaged. In contrast, the RFID tag 1 of the present invention has the advantage whereby, since the first element 32 and the second element 33 extend in the same direction in parallel, the connection point between the base of the first element 32 or the second element 33 and the printed circuit board 20 is not damaged easily, and furthermore has the advantage of allowing for a more compact configuration.

Figure 6:
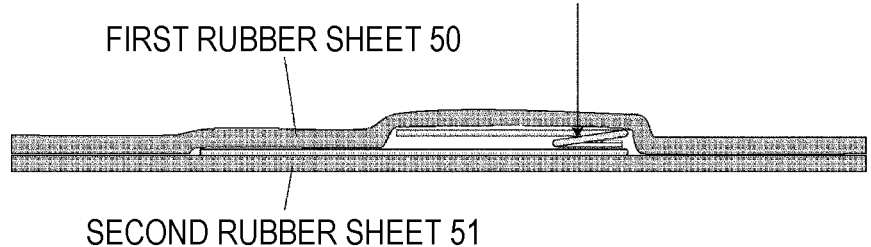
FIG. 6 is a longitudinal section illustrating a state in which both the upper and lower surfaces of an RFID tag for a rubber product are covered by rubber sheets.

As illustrated in FIG. 6, the upper and lower surfaces of the RFID tag 1 for a rubber product may be covered by rubber sheets 50 and 51. Specifically, a rubber-coated RFID tag 1 can be manufactured by placing the RFID tag 1 between a first rubber sheet 50 and a second rubber sheet 51 and crimping the first rubber sheet 50 and the second rubber sheet 51.

General natural rubber or any of various types of synthetic rubbers can be used as the material of the rubber sheets 50 and 51, and furthermore, a material with adhesive properties, such as butyl rubber sheets, may also be used. By covering the RFID tag 1 with the rubber sheets 50 and 51, it is possible to prevent a situation in which the components forming the RFID tag 1 become damaged or the positional relationships between components are displaced, even if the rubber product deforms, and moreover, the RFID tag 1 can be made waterproof and dustproof.

Figure 7:
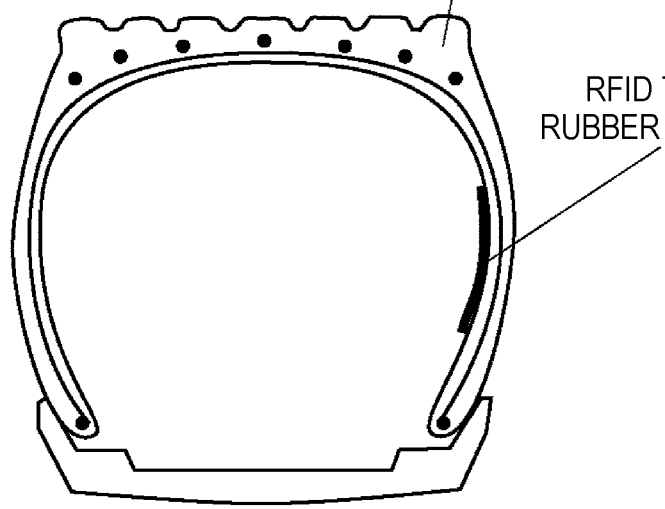
FIG. 7 is a longitudinal section illustrating a state in which an RFID tag for a rubber product is attached to a tire.

FIG. 7 illustrates a state in which the rubber-coated RFID tag 1 is affixed to the inner side of a tire 60 as one example of a rubber product. The position where the RFID tag 1 is affixed is not particularly limited. The RFID tag 1 may be affixed to the inner side of the tire 60 or embedded in the rubber of the tire 60. Additionally, an RFID tag 1 that is not covered with rubber may also be affixed to the inner side of, or embedded in, the tire 60.

By attaching the RFID tag 1 to the tire 60, the second element 33 is electrically connected to the tire and as a result, the tire 60 functions as the ground of the RFID tag 1. Consequently, the RFID tag 1 of the present invention can communicate with high sensitivity even when attached to a rubber product such as the tire 60. The connection between the second element 33 and the tire 60 may be a capacitive connection or a direct connection.

Next, a method of manufacturing the RFID tag 1 for a rubber product will be described.

Figure 8:
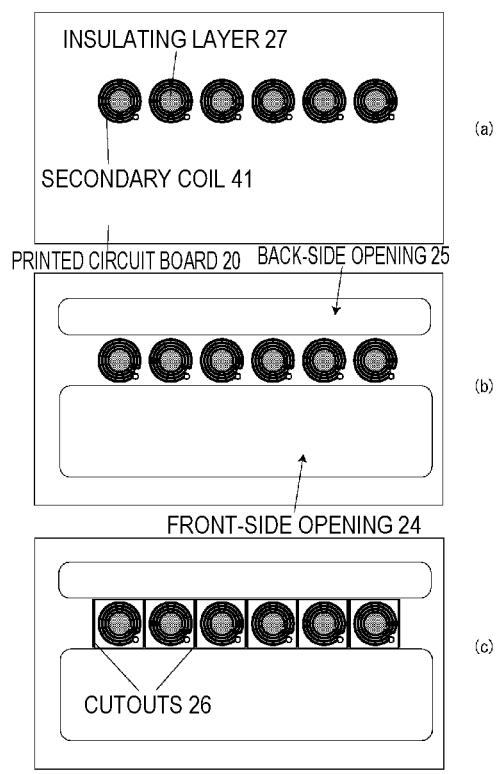
FIG. 8 illustrates plan views (a) to (c) illustrating a method of manufacturing an RFID tag for a rubber product.

As illustrated in FIG. 8(*a*), first, a plurality of secondary coils 41 of the coupling transformer 40 are arranged in the left-right direction on the printed circuit board 20 (step A).

Next, as illustrated in FIG. 8(*b*), openings 24 and are provided on the front and back sides of the plurality of secondary coils 41 (step B). The distance from the front-side opening 24 to the back-side opening must match the length of the RFID tag 1 in the front-back direction.

Next, as illustrated in FIG. 8(*c*), cutouts 26 are made between the plurality of secondary coils 41 (step C). The interval between the cutouts 26 must match the length of the RFID tag 1 in the left-right direction.

Steps A to C are not sequential, and the RF chip 10 must be connected to the secondary coil 41 at the appropriate timing; preferably, the upper surface of the RF chip 10 is covered with the insulating layer 27 after the RF chip 10 is connected to the secondary coil 41.

Figure 9:
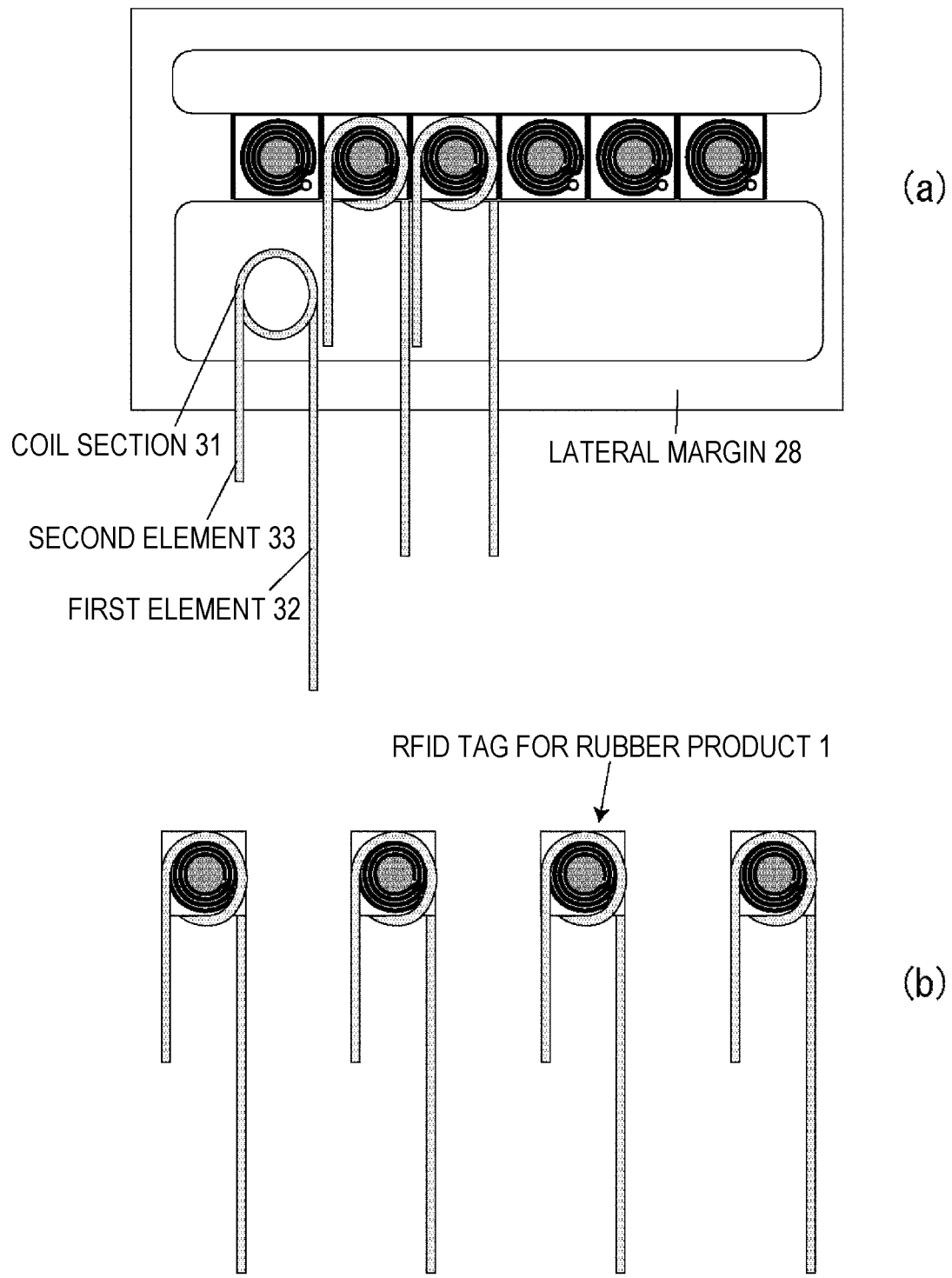
FIG. 9 illustrates plan views (a) and (b) illustrating a method of manufacturing an RFID tag for a rubber product.

Next, as illustrated in FIG. 9(*a*), the front-side opening 24 is used to insert the secondary coil 41 into the gap 31*a* between the strands of the coil section 31. With this arrangement, the coil section 31 functions as the primary side of the coupling transformer 40. At this time, the first element 32 and the second element 33 can be placed on a lateral margin 28 of the front-side opening 24 and the coil section 31 can be moved toward the secondary coil 41 while sliding the upper surface of the lateral margin 28. There is no risk of the antenna 30 falling off the printed circuit board 20 because the first element 32 is placed on the lateral margin 28 with the secondary coil 41 inserted into the gap 31*a* between the strands. If necessary, the coil section 31 and the printed circuit board 20 may be bonded together.

Finally, as illustrated in FIG. 9(*b*), the printed circuit board 20 is cut at the cutouts 26 to complete the RFID tag 1 for a rubber product.

INDUSTRIAL APPLICABILITY

The present invention is an RFID tag for a rubber product and a method of manufacturing an RFID tag for a rubber product, the RFID tag being compact with superior mass productivity and durability, and has industrial applicability.

REFERENCE SIGNS LIST

1: RFID tag for rubber product
10: RF chip
20: Printed circuit board
21: Through-hole
22: Through-hole
23: Insulating layer
24: Front-side opening
25: Back-side opening
26: Cutout
27: Insulating layer
28: Lateral margin
30: Antenna
31: Coil section
31*a*: Gap
32: First element
33: Second element
40: Coupling transformer
41: Secondary coil
50: First rubber sheet
51: Second rubber sheet
60: Tire

The invention claimed is:

1. An RFID tag for a rubber product, the RFID tag comprising:
    a coupling transformer, an RF chip connected to a secondary side of the coupling transformer, a printed circuit board on which the RF chip is mounted, and an antenna, wherein
    the antenna comprises a coil section, a first element extending from one end of the coil section, and a second element extending from another end of the coil section in parallel with the first element and shorter than the first element,
    the coil section has fewer windings than a coil section on the secondary side of the coupling transformer, and
    the printed circuit board is held in a gap between strands of the coil section such that the coil section forms a primary side of the coupling transformer.

2. The RFID tag for a rubber product according to claim 1, wherein
    the RFID tag is for a rubber product containing carbon black.

3. The RFID tag for a rubber product according to claim 1, comprising:
    insulating layers on both upper and lower surfaces of the printed circuit board.

4. The RFID tag for a rubber product according to claim 1, wherein
    the coil section, the first element, and the second element are formed from a single conducting wire.

5. The RFID tag for a rubber product according to claim 1, wherein
    an axis of a secondary coil of the coupling transformer is aligned with an axis of the coil section.

6. The RFID tag for a rubber product according to claim 5, wherein
    a diameter of the coil section of the antenna is the same as an outer diameter of the coil section of the coupling transformer.

7. The RFID tag for a rubber product according to claim 5, wherein
    a diameter of the coil section of the antenna is greater than an outer diameter of the coil section of the coupling transformer.

8. The RFID tag for a rubber product according to claim 5, wherein provided that $\lambda$ is the wavelength of a radio wave at a communication frequency, a portion consisting of the first element, the second element, and the coil section has an electrical length of $\lambda/4$, a diameter of the coil section of the antenna is the same as or greater than an outer diameter of the coil section of the coupling transformer, and an impedance of the RF chip is 100 times or greater than an impedance measured between the first element and the second element of the antenna.

9. The RFID tag for a rubber product according to claim 5, wherein provided that $\lambda$ is the wavelength of a radio wave at a communication frequency, a portion consisting of the first element, the second element, and the coil section has an electrical length of $\lambda/4$, a diameter of the coil section of the antenna is the same as or greater than an outer diameter of the coil section of the coupling transformer, and an impedance of the RF chip is 10 kΩ or less.

10. The RFID tag for a rubber product according to claim 1, wherein
provided that $\lambda$ is the wavelength of a radio wave at a communication frequency, a portion consisting of the first element, the second element, and the coil section has an electrical length of $\lambda/4$.

11. The RFID tag for a rubber product according to claim 1, wherein
provided that $\lambda$ is the wavelength of a radio wave at a communication frequency, a portion consisting of the first element, the second element, and the coil section has an electrical length of $\lambda/2$.

12. The RFID tag for a rubber product according to claim 1, wherein
provided that $\lambda$ is the wavelength of a radio wave at a communication frequency, a portion consisting of the first element, the second element, and the coil section has an electrical length of $(3/4)\lambda$.

13. The RFID tag for a rubber product according to claim 1, wherein
provided that $\lambda$ is the wavelength of a radio wave at a communication frequency, a portion consisting of the first element, the second element, and the coil section has an electrical length of $(5/8)\lambda$.

14. The RFID tag for a rubber product according to claim 1, wherein
an impedance of the RF chip is 100 times or greater than an impedance measured between the first element and the second element of the antenna.

15. The RFID tag for a rubber product according to claim 1, wherein
an impedance of the RF chip is ranged from a few kΩ to 10 kΩ.

* * * * *